US008694197B2

(12) United States Patent
Rajagopalan et al.

(10) Patent No.: US 8,694,197 B2
(45) Date of Patent: Apr. 8, 2014

(54) GAIN/AMPLITUDE DIAGNOSTICS OF NOX SENSORS

(75) Inventors: Sai S. V. Rajagopalan, Sterling Heights, MI (US); Yue-Yun Wang, Troy, MI (US); Scott T Feldmann, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/116,055

(22) Filed: May 26, 2011

(65) Prior Publication Data

US 2012/0303206 A1    Nov. 29, 2012

(51) Int. Cl.
F01N 11/00    (2006.01)

(52) U.S. Cl.
USPC ............. 701/30.8; 701/32.1; 701/2; 701/114; 701/104; 701/109

(58) Field of Classification Search
USPC ............................. 701/104, 109, 31.6, 2, 114
See application file for complete search history.

(56) References Cited

U.S. PATENT DOCUMENTS

| | | | | |
|---|---|---|---|---|
| 5,508,926 A * | 4/1996 | Wade | ............................ | 701/29.4 |
| 6,375,828 B2 * | 4/2002 | Ando et al. | .................... | 205/781 |
| 6,854,262 B2 * | 2/2005 | Yoshizawa et al. | ............. | 60/276 |
| 6,923,902 B2 * | 8/2005 | Ando et al. | .................... | 205/781 |
| 6,990,402 B2 * | 1/2006 | Yasui et al. | .................... | 701/108 |
| 7,096,123 B1 * | 8/2006 | McAdams et al. | ............. | 702/22 |
| 7,778,766 B1 * | 8/2010 | Cowgill et al. | ............... | 701/108 |
| 7,854,161 B2 * | 12/2010 | Hjorsberg et al. | ......... | 73/114.75 |
| 8,036,814 B2 * | 10/2011 | Weber et al. | .................. | 701/109 |
| 8,056,544 B2 * | 11/2011 | Webb et al. | ............... | 123/568.12 |
| 8,099,947 B2 * | 1/2012 | Makki et al. | ..................... | 60/277 |
| 8,161,944 B2 * | 4/2012 | Moriya et al. | ................ | 123/435 |
| 8,171,720 B2 * | 5/2012 | Wang et al. | ..................... | 60/277 |
| 8,201,444 B2 * | 6/2012 | Wang et al. | ................ | 73/114.75 |
| 8,209,110 B2 * | 6/2012 | Weber et al. | .................. | 701/109 |
| 8,245,567 B2 * | 8/2012 | Wang et al. | ................ | 73/114.75 |
| 2004/0130442 A1 * | 7/2004 | Breed et al. | .................... | 340/443 |
| 2004/0139736 A1 * | 7/2004 | Yoshizawa et al. | ............. | 60/285 |
| 2004/0158387 A1 * | 8/2004 | Yasui et al. | .................... | 701/108 |
| 2007/0256406 A1 * | 11/2007 | Makki et al. | ..................... | 60/277 |
| 2009/0229356 A1 | 9/2009 | Kariya et al. | | |
| 2010/0043397 A1 * | 2/2010 | Wang et al. | ..................... | 60/273 |
| 2010/0115924 A1 * | 5/2010 | Gabe et al. | ........................ | 60/285 |
| 2011/0106401 A1 * | 5/2011 | Kumar et al. | ................. | 701/102 |
| 2011/0214650 A1 * | 9/2011 | Wang et al. | .................... | 123/703 |
| 2012/0029793 A1 * | 2/2012 | Weber et al. | .................. | 701/104 |
| 2012/0255277 A1 * | 10/2012 | Rajagopalan et al. | .......... | 60/274 |

FOREIGN PATENT DOCUMENTS

JP    2002047979 A    2/2002

* cited by examiner

Primary Examiner — John R Olszewski
Assistant Examiner — Jean-Paul Cass
(74) Attorney, Agent, or Firm — Reising Ethington P.C.

(57) ABSTRACT

A method of diagnosing vehicle NOx sensor faults that includes sensing that an exhaust gas recirculating (EGR) valve is closed and that fuel flow to a vehicle engine is above a predetermined rate using an electronic control unit (ECU) located on a vehicle; recording the output received from an NOx sensor relative to an amount of fuel consumption over a period of time using the ECU; calculating the mean of the NOx sensor output relative to fuel consumption recorded over the period of time using the ECU; performing a least-squares estimation (LSE) using the ECU for more than one calculated mean based on an expected NOx sensor output; generating a NOx sensor gain for the NOx sensor using the ECU based on the LSE; and determining whether the NOx sensor gain is above or below a predetermined threshold.

18 Claims, 4 Drawing Sheets

GAIN/AMPLITUDE DIAGNOSTICS OF NOX SENSORS

TECHNICAL FIELD

This disclosure pertains to on-vehicle testing methods to assess electrical output signals from sensors placed in diesel engine (or other lean-burn engine) exhaust gas streams to detect amounts of nitrogen oxides (NOx) in the exhausts. Such NOx concentration-related voltage or current signals are used by on-vehicle computer-based control systems for management of engine operation, and for management and assessment of engine exhaust treatment. More specifically, this disclosure pertains to on-vehicle testing of such NOx sensors to assess their accuracy with respect to exhaust compositions.

BACKGROUND OF THE INVENTION

Multi-cylinder, reciprocating piston vehicle engines for driving automotive vehicles produce hot flowing exhaust gas streams which are treated after they leave the exhaust manifold of the engine to oxidize unburned hydrocarbons and carbon monoxide to carbon dioxide and water, and to reduce mixtures of nitrogen oxides (NOx) to nitrogen and water before the gas is released from the tailpipe into the atmosphere.

Many spark-ignited, gasoline engines are operated with fuel and air additions to the engine cylinders varying closely about the stoichiometric air-to-fuel mass ratio of about 14.7/1. Exhaust after-treatment is then accomplished using an oxygen sensor and a three-way catalyst system which is managed to promote both oxidation and reduction reactions for yielding a cleaned exhaust. Diesel fueled, compression-ignition engines, and other lean-burn engines are generally operated at air-to-fuel mass ratios that are well above the stoichiometric ratio and, thus, charge an abundance of air into the combustion cylinders. The exhaust from such engine operations contains more oxygen and nitrogen oxides than traditional gasoline engine exhaust. Exhaust treatment from lean-burn engines often uses an upstream oxidation catalyst for unburned hydrocarbons and carbon monoxide, and for oxidation of some NO to $NO_2$. After passage through the oxidation catalyst, a reductant material for nitrogen oxides, such as urea, is injected into and mixed with the hot exhaust gas. The gas is then passed into contact with a catalyst material selected for a reaction between reductant material and nitrogen oxides to form nitrogen and water for release from the exhaust passage. The reaction is called a "reduction" reaction because the oxygen content of the nitrogen compounds is reduced. This exhaust gas reduction practice is often called selective catalytic reduction (SCR) of NOx.

SCR-type exhaust after-treatment systems require NOx sensors that are inserted in the exhaust stream for use in managing the addition of the reductant material to the exhaust stream and other after-treatment practices. Alternatively, or in addition, the NOx sensors can be used as part of an on-board diagnostic (OBD) system monitoring system that can to indicate the overall functionality of the vehicle emission system. NOx sensors are often formed as small electrochemical cells that function, for example, by producing voltage or electrical current signals responsive to the amount of nitrogen oxide species flowing in the exhaust and over sensor surfaces. NOx sensor data may be also used in assessing whether catalysts for NOx reduction, or other exhaust after-treatment materials, are working properly.

There is a need for on-vehicle systems and practices for determining whether a NOx sensor in an exhaust stream is performing properly. When a NOx sensor used in a vehicle exhaust system is not functioning properly, it is often necessary for the fault to be promptly diagnosed and reported to a vehicle operator. This disclosure pertains to on-vehicle, computer-conducted and managed diagnostic methods to assess certain aspects of the performance capabilities of these important NOx sensors.

SUMMARY OF THE INVENTION

The exhaust stream from a diesel engine typically contains, by volume, up to about ten percent of oxygen, about 100 to 2000 parts-per million (ppm) of nitrogen oxide (NO), and about 20-200 ppm of nitrogen dioxide ($NO_2$). A NOx sensor is employed at a predetermined location in the exhaust stream to quickly determine current quantities of NOx constituents for determining, for example, how much reductant material should be currently added to affect conversion of the NOx to nitrogen and water. In this example, the sensor would be located upstream of a reductant material injection device and of an SCR catalyst material. In another example, a NOx sensor is located downstream of an SCR catalyst material, in the flow of the exhaust stream, to confirm the reduction of the NOx.

Many sensors for nitrogen oxides in engine exhaust streams are made of ceramic-type metal oxides such as zirconium oxide (zirconia, $ZrO_2$) stabilized with yttrium oxide (yttria, $Y_2O_3$). These materials have been used in oxygen sensors and are adapted as NOx sensors. They are compacted as dense ceramics that conduct oxygen ions at the high temperatures of a tailpipe, such as 300° C., and higher. A surface of the oxide body of the sensor is provided with a pair of high temperature electrodes which may be formed, for example, of platinum, gold, or palladium, or of other metal oxides. The sensor is formed to provide an electrical signal such as a change in voltage or current as a function of concentration of nitrogen oxides at the sensor location in the exhaust stream. Electrical leads from a sensor are used to transmit the signal to a suitable computer control system for managing the operation of the exhaust treatment system. A computer based system for controlling exhaust treatment may be part of, or in communication with, an engine operating control system because of the close relationship between management of engine fueling and operation and exhaust gas composition.

In accordance with embodiments of this invention, algorithms are provided for on-vehicle, computer-managed diagnosis of operating characteristics of one or more NOx sensors use in remediation of the vehicle's exhaust gas stream. These algorithms can determine the gain and/or the offset of the NOx sensor using a least squares estimate of gathered NOx sensor output data and compare the determined gain/offset with known accuracy thresholds.

BRIEF DESCRIPTION OF THE DRAWINGS

One or more preferred exemplary embodiments of the invention will hereinafter be described in conjunction with the appended drawings, wherein like designations denote like elements, and wherein.

DESCRIPTION OF PREFERRED EMBODIMENTS

The method described herein can diagnose NOx sensor accuracy using the output generated from such sensors. More specifically, the method can determine if NOx sensor gain is too low or high with respect to the output that is expected from such a sensor. In addition, the method can be used to determine if the output from the NOx sensor is consistently above or below (e.g. offset from) a zero-point. These determinations can be made by performing a least-squares estimation (LSE) that analyzes the output received from the NOx sensor. NOx sensor offsets that are above/below the zero point or gain that is outside of normal boundaries can cause emissions breakthrough because of incorrect urea dosage and also cause inability to diagnose SCR catalyst faults. On the other hand, NOx sensors having an abnormally high gain and/or an offset above the zero point can cause excessive treatment of exhaust gas and can lead to ammonia slip.

During vehicle operation, it is possible that NOx sensors can fail to accurately measure the amount of NOx constituents in the exhaust gas. The NOx sensor accuracy can affect the amount of treatment added to the exhaust gas. If the NOx sensor fails to accurately respond to changes in exhaust gas NOx content, the treatment levels added to the exhaust gas may be larger or smaller than that which is desired thereby leading to the excessive emissions breakthrough or ammonia slip discussed above. Thus, detecting the gain of the NOx sensor as well as a low/high offset NOx sensor condition and alerting a driver of these conditions can lead to its quick correction.

The methods described herein can be applied to NOx sensors located both upstream of and downstream of the SCR system. When the NOx sensor is located upstream of the SCR, the output from the NOx sensor can be compared with data in a lookup table that represents the output of a normally functioning NOx sensor Turning to FIG. 1, a vehicle 10 is shown that includes an engine control unit (ECU) 12 that not only receives data output from NOx sensors but also performs various computing tasks onboard the vehicle 10. Vehicle 10 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 10 includes a vehicle engine (not shown) for propulsion, such as the Diesel-fueled, compression-ignition engines discussed above or other lean-burn engines.

Figure 2:
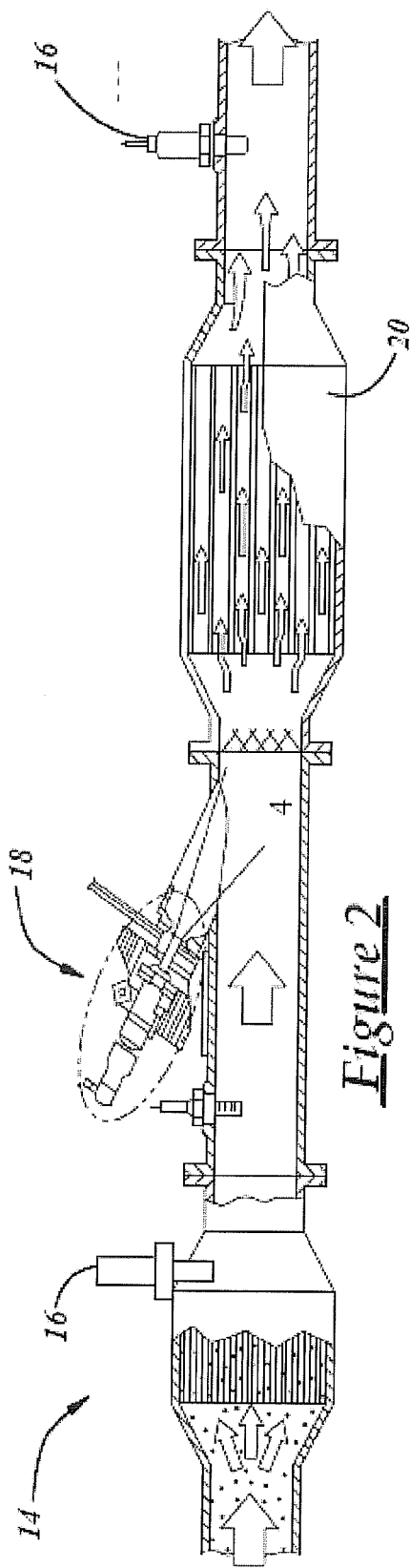
FIG. 2 is a diagram depicting an exemplary embodiment of a vehicle exhaust system used with the method described herein.

Turning to FIG. 2, a vehicle exhaust system 14 used by the vehicle 10 is shown that can expel exhaust gases that include NOx. The vehicle exhaust system 14 can include various elements, such as one or more NOx sensors 16 for measuring the NOx content of the exhaust gas, a dosing module 18 for introducing ammonia or some other exhaust treatment into the exhaust gas, and a SCR catalyst 20 through which the treated exhaust gas will flow. The NOx sensors 16 can be located in such a way to monitor exhaust gas as it leaves the vehicle engine and/or positioned downstream of the SCR catalyst 20 to measure the NOx content of the treated exhaust.

Figure 1:
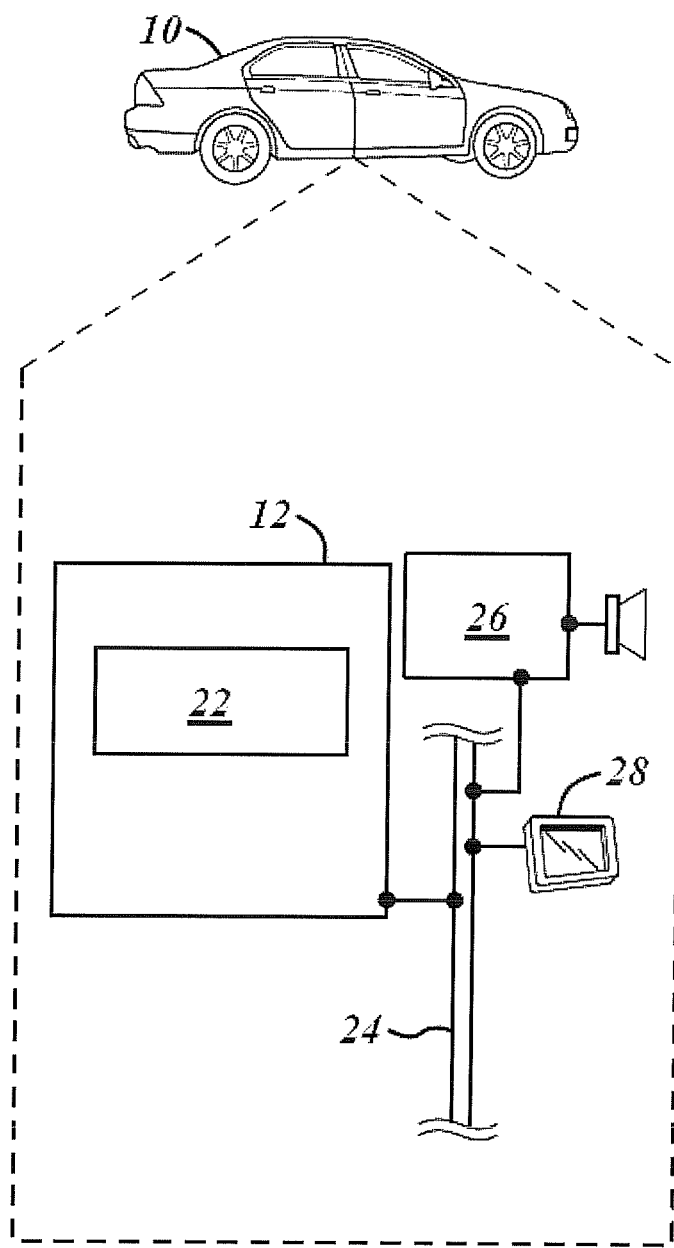
FIG. 1 is a diagram depicting an exemplary embodiment of a vehicle used with the method described herein.

The ECU 12 shown in FIG. 1 can be any type of device capable of processing electronic instructions including microprocessors, microcontrollers, host processors, controllers, vehicle communication processors, and application specific integrated circuits (ASICs). It can be a dedicated processor used only for controlling vehicle engine/emissions functions or can be shared with other vehicle systems. ECU 12 executes various types of digitally-stored instructions, such as software or firmware programs stored in memory 22, which enable the ECU 12 to provide a wide variety of services. At least some of this software is capable of performing mathematical analysis, such as LSE or linear regression analysis. And a vehicle bus 24 can communicate data and exchange commands between the NOx sensor 16 and the ECU 12—as well as other modules located on the vehicle 10. Some of these other modules include an audio system 26 having at least one speaker and a visual display 28 that are capable of audibly or visually communicating messages to a vehicle occupant. For instance, ECU 12 can execute programs or process data to carry out at least a part of the method discussed herein. In addition, the ECU 12 can include one or more timers and/or counters that can provide a timing and/or a counting function for the method discussed herein.

Figure 3:
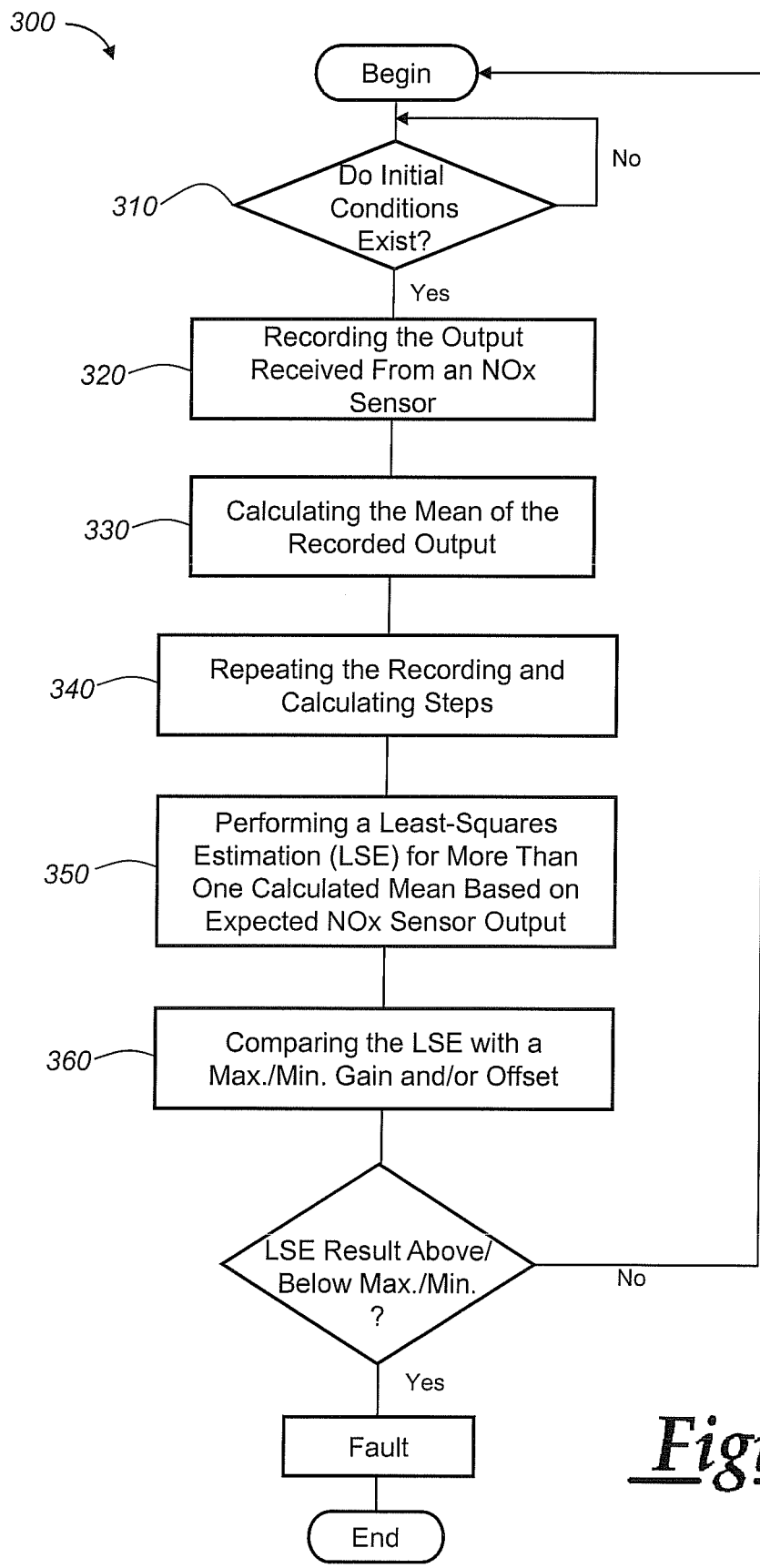
FIG. 3 is a flow chart of an exemplary embodiment of the method described herein.

Turning to FIG. 3, there is shown an exemplary method 300 of diagnosing vehicle NOx sensor faults. The method 300 can begin at step 310 by determining if one or more predetermined initial conditions exist that relate to vehicle operation. A number of initial conditions can be checked before beginning the method 300. For example, these conditions can include determining that an exhaust gas recirculating (EGR) valve is closed and that the rate of fuel flow to the vehicle engine is above a predetermined threshold. In this configuration, the closure of the EGR valve can increase the level of NOx particle content in the exhaust gas, thereby increasing the resolution of NOx sensor output. In addition, it can be determined that the rate of fuel flow to the vehicle engine is above a certain threshold. When this is so, the vehicle engine may be producing an adequate amount of NOx thereby increasing the resolution of the NOx sensor output. By closing the EGR valve and/or determining that fuel flow is above a predetermined rate, the method 300 can help ensure that sufficient levels of NOx are present in the exhaust gas so as to result in an accurate diagnosis of NOx sensor faults. Each of these conditions can be detected in a variety of ways, such as using the ECU 12 to receive a signal from one or more vehicle sensors that are capable of sensing the position of the EGR valve and/or the rate of fuel flow to the vehicle engine.

Other combinations of initial conditions can be used to determine whether NOx sensor diagnosis shall begin. For example, the ECU 12 can detect the presence of a test flag that directs the ECU 12 to begin diagnosing NOx sensor faults. In another example, an initial condition can include measuring the amount of time the EGR valve is closed. If the EGR valve is closed more than a predetermined amount of time, then the initial conditions may be met. The amount of time can be measured based on a timer that can be set in the ECU 12 or other time-keeping device. It is also possible to specify certain initial conditions depending on the location of the NOx sensor 16 in the vehicle exhaust system 14. For instance, NOx sensors 16 that are positioned downstream of the SCR catalyst 20 may be more accurately analyzed when the temperature of the SCR catalyst 20 is within a particular temperature range. The accuracy of the NOx sensor diagnostic method 300 may improve when the SCR catalyst 20 is above/below a certain temperature, such as may occur during cold starts or after a period of vehicle operation that can heat the SCR catalyst 20. To give some examples, this type of initial condition could call for an SCR catalyst temperature below 250° C. or above 500° C. The temperature of the SCR catalyst 20 can be monitored using temperature sensors that output electrical signals to the ECU 12 where they are monitored and compared with thresholds that are stored on-board the vehicle 12 in the memory device 22. The method 300 proceeds to step 320.

At step 320, the output received from the NOx sensor 16 relative to an amount of fuel consumption is recorded over a period of time. The NOx sensor output can begin to be recorded when one or more initial conditions described with regard to step 310 are fulfilled—and potentially when the one or more conditions are fulfilled for a predetermined amount of time. Alternatively, the recording of NOx sensor output can begin based on the direction of a technician or other test signal that is received at a central controller, such as the ECU 12.

In an exemplary implementation, output from a NOx sensor 16 and the rate of fuel flow to a vehicle engine is recorded when the initial conditions set forth in step 310 exist. The output from the NOx sensor 16 can be recorded over a predetermined period of time while the EGR valve is closed and fuel flow is above the predetermined threshold. The process of recording NOx sensor output can include specifying a data sampling rate and a period of time over which to sample output from the NOx sensor 16. Each of the data sampling rate and the period of time can influence the number of data points gathered while output from the NOx sensor 16 is recorded. Or in other words, both the rate and period can be changed to obtain a desired number of data points. It is also possible that a prescribed number of data points can be established as a value in the ECU 12 or memory device 22. In another example, the ECU 12 can determine that one or more initial conditions have been satisfied for a predetermined amount of time. Then, the ECU 12 can begin to record NOx sensor output for the predetermined period of time during which the ECU 12 writes the data representing NOx sensor output to the memory 22 located on board the vehicle 10 at a particular data sampling rate. The recorded NOx data can include not only data representing the amount of NOx particles in the exhaust gas streams but also data representing vehicle engine operation metrics that can influence NOx particle amount. These vehicle engine operation metrics include one or more of vehicle engine revolutions-per-minute (RPM), fuel flow rate to the vehicle engine, or ambient temperature to name a few. The method 300 proceeds to step 330.

At step 330, the mean of the recorded output is calculated. Calculating the mean (e.g. arithmetic mean) of the recorded data (e.g. representing NOx sensor output) can include a normalization of the recorded data based on one or more vehicle operation metrics in order to reduce variables that may cause noise. These metrics can include the rate of fuel consumption or the vehicle engine RPMs. In doing so, the mean can be calculated based on output that has been recorded within a particular range of RPMs and/or a range of fuel flow. That way, NOx output should not vary based on fuel flow and/or vehicle engine RPM. This normalization of recorded output may be omitted when determining if one or more initial conditions exist, as is described in step 310. That way, the recorded output from the NOx sensor 16 may already represent a uniform or constant engine operation configuration. And regardless of the whether variations in the recorded NOx sensor data may be normalized based on the engine RPMs/fuel flow or using the determination of step 310, the mean of the recorded data can be determined using known calculation methods that can be carried out using computing capabilities, such as those capable by the ECU 12. The method 300 proceeds to step 340.

At step 340, step 320 and step 330 are repeated more than once to generate a plurality of means or mean values. Once the mean is calculated in step 330, the method 300 can benefit from the calculation of additional mean values. For instance, the method 300 can call for setting an iteration value that can determine how many means will be calculated before proceeding further. In one example, this value can be five mean values. That is, the output from a NOx sensor 16 can be recorded for a period of time, a plurality of data points from the NOx sensor 16 can be recorded during that time, and a second mean value can be calculated. This process can be iterative, thereby producing a third mean value, a fourth mean value, and so on. With respect to units, the mean value can represent the mean amount of measured NOx particles in the exhaust gas calculated from the recorded NOx sensor output. While this example has been described with respect to five mean values, it is possible to use fewer or more mean values. The method 300 proceeds to step 350.

At step 350, a least-squares estimation (LSE) is performed for more than one calculated mean based on an expected NOx sensor output. The LSE is performed based on the plurality of mean values with respect to expected output from a healthy NOx sensor 16. The expected output from a healthy NOx sensor 16 may be stored in a database, such as can be realized by a lookup table that is stored in the memory device 22 at the vehicle 12. In one example, the expected output from a healthy NOx can be stored in a lookup table that includes hypothetical NOx output from a healthy NOx sensor 16 at various fuel flow and RPM measurements as well as values that take into consideration whether the EGR is closed or not.

The LSE can be carried out using an ordinary least-squares calculation that can fit a linear regression model or linear estimation for the mean values with respect to the output expected from a healthy NOx sensor 16. The dependent variable can represent the expected NOx sensor output whereas the independent variable can be the calculated means of the recorded or measured NOx sensor values. For instance, the LSE can fit a line or linear equation that represents the calculated mean values. The linear equation can be represented in slope intercept form (e.g. y=mx+b) in which "y" represents the independent variable, "x" represents the dependent variable, "m" represents the slope, and "b" represents the intercept on the y-axis. Using this form, the value "b" can represent an offset value for the NOx sensor 16, which can indicate how far offset the output of the NOx sensor 16 is from the actual value of NOx particles in the exhaust gas. For instance, if the value "b" in the linear equation is zero, it can be determined that the output generated by the NOx sensor 16 may not be offset from the actual amount of NOx in the exhaust gas. However, if the "b" value is non-zero, it can be determined that the output from the NOx sensor 16 is offset by the amount indicated by the "b" value.

Given the linear regression model generated using the LSE, the NOx sensor gain can be calculated based on the LSE. Using the slope intercept form to represent the LSE or linear regression, the slope of this line (m) can represent the gain of the NOx sensor 16. In that case, the slope of the LSE output over a range of calculated mean values can indicate the gain of the NOx sensor 16 with respect to the hypothetical or expected NOx sensor 16.

The expected values of the healthy NOx sensor can also be used to set a low gain threshold and a high gain threshold for assessing the health of the NOx sensor 16. For example, given the expected output of the NOx sensor 16, a technician, engineer, or other person can set thresholds for gain above or below which would indicate that the NOx sensor 16 may be operating poorly or at best inefficiently. Low gain threshold and high gain threshold values can be stored in the memory 22 of the vehicle 10 to be accessed by the ECU 12. Similarly, thresholds can also be established for comparing the offset detected using the LSE with predetermined values that establish a maximum offset for the NOx sensor 16. The method 300 proceeds to step 360.

At 360, the LSE output is compared with a maximum gain or a minimum gain for a healthy NOx sensor at the recorded rate of fuel flow. This can mean that the gain and/or the offset determined from the LSE for the NOx sensor 16 can be compared to known thresholds that have been established based on healthy NOx sensor performance. It can then be determined whether the NOx sensor gain is above or below a predetermined threshold. This can be carried out by comparing the LSE output with a minimum/maximum gain threshold to determine if the LSE output rises above the high-gain threshold or falls below the low gain threshold. The LSE can also be used to determine if an offset condition exists by comparing the offset determined using the LSE with predetermined values that establish a maximum offset for the NOx sensor. The comparisons between the gain and/or offset determined using the LSE and any thresholds can be carried out using the ECU 12 or other computing device. If the gain determined using the LSE exceeds the high-gain threshold or falls below the low-gain threshold, an error message can be generated and conveyed to a vehicle occupant or vehicle technician. This can be accomplished by activating a visual and/or audible alert in the vehicle 12 using audio system 26 and/or visual display 28. Additionally, or alternatively, the ECU 12 can set a flag that indicates a fault exists or has existed with the NOx sensor 16. The method 300 then ends.

Figure 4:
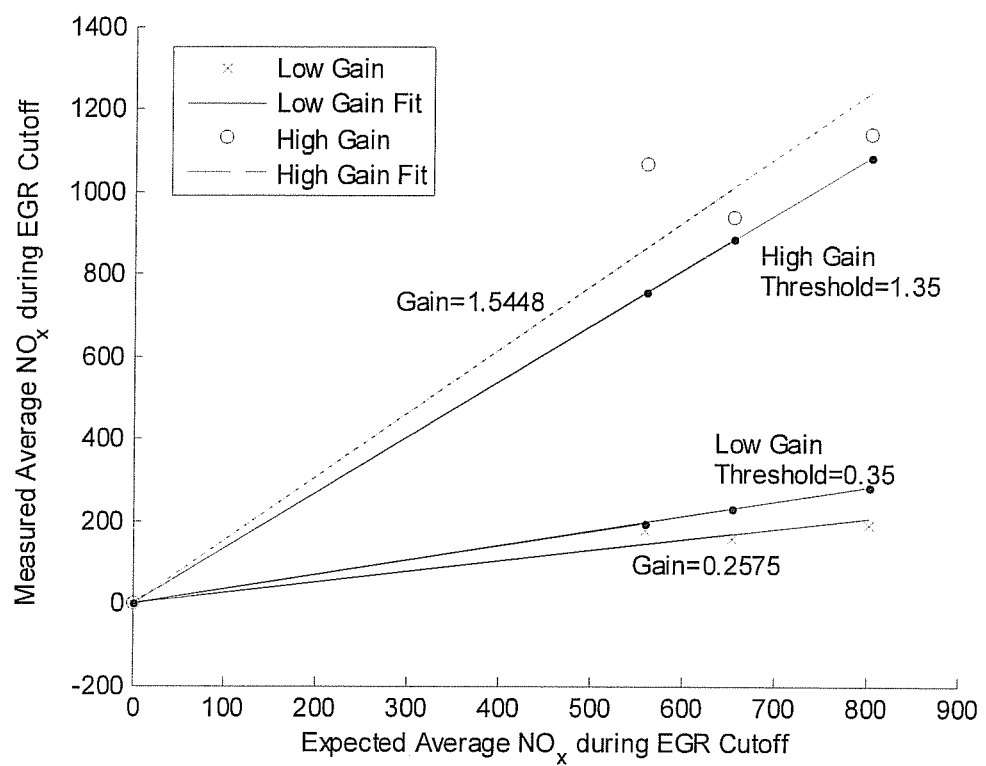
FIG. 4 is a graph depicting an exemplary embodiment of the method described herein.

Turning to FIG. 4, a graph is shown that relates the LSE of the measured or recorded NOx sensor output with the expected behavior of the NOx sensor 16, as well as the low and high gain thresholds. This graph may help illustrate at least some of the concepts described above. Two examples are shown in the graph, one in which the gain determined from the LSE of recorded NOx output may fall below a low-gain threshold (low-gain example) and another example in which the gain determined from the LSE of recorded NOx output may rise above a high-gain threshold (high-gain example). As can be appreciated from the graph, a line representing a high/low gain threshold can cross the y-axis at zero and have a slope equaling the gain threshold. Or in other words, the slope of the line can represent a low or a high gain threshold. In this case, the high gain threshold is 1.35 and the low gain threshold is 0.35. In the low-gain example, the linear regression determined by the LSE has a slope (e.g. gain) of 0.2575 which falls below the low gain threshold. As can be appreciated from the graph, the line having a slope/gain of 0.2575 also passes the y-axis at zero, which can indicate that the NOx sensor 16 in this example does not have an offset. In the low gain example, a comparison of the measured gain (0.2575) as determined by the LSE may result in a diagnostic fault for this particular NOx sensor 16. In the high-gain example, the linear regression determined by the LSE has a slope (e.g. gain) of 1.5448 which falls above the threshold. As can be appreciated from the graph, the line having a slope/gain of 1.5448 also passes the y-axis at zero, which can indicate that the NOx sensor 16 in this example does not have an offset. In the high gain example, a comparison of the measured gain as determined by the LSE may result in a diagnostic fault for this particular NOx sensor 16.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of diagnosing vehicle NOx sensor faults, comprising the steps of:
   (a) sensing that an exhaust gas recirculating (EGR) valve is closed and that fuel flow to a vehicle engine is above a predetermined rate using an electronic control unit (ECU) located on a vehicle and programmed to carry out the method steps;
   (b) recording the output received from an NOx sensor relative to an amount of fuel consumption in response to step (a) over a period of time using the ECU;
   (c) calculating the mean of the NOx sensor output relative to fuel consumption recorded over the period of time using the ECU;
   (d) repeating steps (a) and (b) at least once;
   (e) performing a least-squares estimation (LSE) using the ECU for more than one calculated mean based on an expected NOx sensor output;
   (f) generating a NOx sensor gain for the NOx sensor using the ECU based on the LSE; and
   (g) determining whether the NOx sensor gain is above or below predetermined a threshold.

2. The method of claim 1, wherein step (b) further comprises establishing a data sampling rate, a period of time during which to record, or both.

3. The method of claim 1, further comprising the step of determining if one or more of the following temperatures fall above or below a predetermined value: an ambient temperature, an engine temperature, or an SCR catalyst temperature.

4. The method of claim 3, further comprising the step of determining if the one or more for more than a predetermined amount of time.

5. The method of claim 1, wherein step (c) further comprises normalizing the recorded data based on one or more vehicle operation metrics.

6. The method of claim 1, further comprising the step of storing the expected output from a healthy NOx sensor as a lookup table in memory at the vehicle.

7. The method of claim 1, wherein performing the LSE further comprises fitting a linear equation to a plurality of calculated means based on expected output from a healthy NOx sensor.

8. The method of claim 7, wherein the linear equation is used to determine the NOx sensor gain, a NOx sensor offset, or both.

9. The method of claim 7, wherein the slope of the linear equation represents the gain of the NOx sensor.

10. The method of claim 8, wherein the y-intercept of the linear equation represents the NOx sensor offset.

11. A method of diagnosing vehicle NOx sensor faults, comprising the steps of:
 (a) determining that an exhaust gas recirculating (EGR) valve is closed and that fuel flow on the vehicle is above a predetermined rate using an electronic control unit (ECU) located on a vehicle and programmed to carry out the method steps;
 (b) recording output from a NOx sensor using the ECU when the EGR valve is closed and the fuel flow is above the predetermined rate;
 (c) calculating the mean of the recorded output using the ECU;
 (d) repeating step (b) and step (c) more than once to generate a plurality of means;
 (e) performing a least squares estimate (LSE) on the plurality of means using the ECU based on expected NOx output data values included in a lookup table;
 (f) comparing the output of the LSE with a maximum gain or a minimum gain for a healthy NOx sensor using the ECU; and
 (g) determining if the output of the LSE is greater than or less than the data values included in the lookup table using the ECU.

12. The method of claim 11, wherein performing the LSE further comprises fitting a linear equation to the plurality of calculated means based on expected output from a healthy NOx sensor.

13. The method of claim 12, wherein the linear equation is used to determine the NOx sensor gain, a NOx sensor offset, or both.

14. The method of claim 12, wherein the slope of the linear equation represents the gain of the NOx sensor.

15. The method of claim 13, wherein the y-intercept of the linear equation represents the NOx sensor offset.

16. A method of diagnosing vehicle NOx sensor faults, comprising the steps of:
 (a) determining that an exhaust gas recirculating (EGR) valve is closed and that the fuel flow to a vehicle engine is above a predetermined threshold using an electronic control unit (ECU) located on a vehicle and programmed to carry out the method steps;
 (b) recording the output from an NOx sensor over a predetermined amount period of time while the EGR valve is closed and fuel flow is above the predetermined threshold using the ECU;
 (c) calculating the mean value of the recorded output using the ECU;
 (d) performing step (b) and step (c) a plurality of times thereby generating a plurality of mean values;
 (e) calculating a least squares estimate (LSE) of the plurality of mean values with respect to expected output from a healthy NOx sensor using the ECU;
 (f) detecting an offset between the actual output from the NOx sensor and the expected output based on the calculated LSE using the ECU; and
 (g) monitoring output from the NOx sensor to determine if the output rises above the high-gain threshold or falls below the low gain threshold.

17. The method of claim 16, wherein calculating the LSE further comprises fitting a linear equation to a plurality of calculated mean values based on expected output from a healthy NOx sensor.

18. The method of claim 17, wherein the linear equation is used to determine the NOx sensor gain, an NOx sensor offset, or both.

* * * * *